United States Patent
Jung et al.

(10) Patent No.: US 9,349,075 B2
(45) Date of Patent: May 24, 2016

(54) IMAGE PROCESSING APPARATUS AND METHOD FOR DETECTING TRANSPARENT OBJECT IN IMAGE

(71) Applicant: SAMSUNG ELECTRONICS CO., LTD., Suwon (KR)

(72) Inventors: Seung Won Jung, Seoul (KR); Seung Kyu Lee, Seoul (KR); Ouk Choi, Yongin (KR); Do Kyoon Kim, Seongnam (KR); Kee Chang Lee, Yongin (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 270 days.

(21) Appl. No.: 13/888,803

(22) Filed: May 7, 2013

(65) Prior Publication Data

US 2014/0112531 A1 Apr. 24, 2014

(30) Foreign Application Priority Data

Oct. 24, 2012 (KR) ........................ 10-2012-0118406

(51) Int. Cl.
*G06K 9/00* (2006.01)
*G06K 9/62* (2006.01)

(52) U.S. Cl.
CPC .............. *G06K 9/6217* (2013.01); *G06K 9/00* (2013.01)

(58) Field of Classification Search
CPC ....... G06K 9/6217; G06K 9/00; A47J 31/053; A47J 31/0615; A47J 31/18; G06T 7/0079
See application file for complete search history.

(56) References Cited

U.S. PATENT DOCUMENTS

| | | | |
|---|---|---|---|
| 9,070,319 B1 * | 6/2015 | Soni .......................... | G09G 5/14 |
| 9,080,986 B2 * | 7/2015 | Hirai ....................... | G01N 21/21 |
| 2002/0190989 A1 | 12/2002 | Kamata et al. | |

FOREIGN PATENT DOCUMENTS

| | | |
|---|---|---|
| JP | 2009-116532 | 5/2009 |
| JP | 2009-301309 | 12/2009 |
| KR | 2003-0012889 | 2/2003 |
| KR | 10-2011-0116166 | 10/2011 |

* cited by examiner

*Primary Examiner* — Tom Y Lu
(74) *Attorney, Agent, or Firm* — Harness, Dickey & Pierce, P.L.C.

(57) ABSTRACT

Provided is an image processing apparatus and method for detecting a transparent image from an input image. The image processing apparatus may include an image segmenting unit to segment an input image into a plurality of segments, a likelihood determining unit to determine a likelihood that a transparent object is present between adjacent segments among the plurality of segments, and an object detecting unit to detect the transparent object from the input image based on the likelihood.

28 Claims, 8 Drawing Sheets

IMAGE PROCESSING APPARATUS AND METHOD FOR DETECTING TRANSPARENT OBJECT IN IMAGE

CROSS-REFERENCE TO RELATED APPLICATION

This application claims the priority benefit of Korean Patent Application No. 10-2012-0118406, filed on Oct. 24, 2012, in the Korean Intellectual Property Office, the disclosure of which is incorporated herein by reference.

BACKGROUND

1. Field

One or more embodiments relate to an image processing apparatus and method, and more particularly, to an image processing apparatus and method for detecting a transparent image from an input image.

2. Description of the Related Art

A time-of-flight (TOF) camera may emit output light toward an object, may receive reflected light that is reflected from the object by the output light, and may measure depth information of the object based on amplitude of the reflected light. Accordingly, when the light is immediately reflected from the object, depth information of the object may be accurately measured.

When an object is transparent, a portion of output light may pass through the object and be reflected from another object or a background and then be received by the TOF camera. For example, light that is reflected from the transparent object and light that is reflected from the background may be mixed in the reflected light received by the TOF camera and thus, accuracy of depth information of the object measured by the TOF camera may decrease.

Accordingly, there is a desire for an image processing method that may detect a transparent object from an image, in order to enhance accuracy of depth information of an object.

SUMMARY

The foregoing and/or other aspects are achieved by providing an image processing apparatus, including an image segmenting unit to segment an input image into a plurality of segments; a likelihood determining unit to determine a likelihood that a transparent object is present between adjacent segments among the plurality of segments; and an object detecting unit to detect the transparent object from the input image based on the likelihood.

The image segmenting unit may segment the input image based on at least one of a depth image and an amplitude image included in the input image.

The likelihood determining unit may determine a likelihood that a segment pair including adjacent segments belong to a group associated with a transparency attribute. The group associated with the transparency attribute may include a segment pair in which at least one segment is transparent.

The likelihood determining unit may determine a likelihood that a segment pair including adjacent segments belong to a group associated with a transparency attribute, using a learning model associated with feature extraction.

The learning model may extract a feature based on amplitude and depth of the respective segments constituting a segment pair using a test image.

The object detecting unit may detect the transparent object using one of a global optimization scheme based on the likelihood and a local optimization scheme based on the likelihood.

The foregoing and/or other aspects are achieved by providing an image processing apparatus, including an image segmenting unit to segment a test image into a plurality of segments, a group determining unit to determine a group associated with a transparency attribute that is belonged by a segment pair including adjacent segment among the plurality of segments, and a learning unit to perform a learning process of extracting a feature associated with the segment pair based on the group belonged by the segment pair.

The group determining unit may determine whether at least one of the adjacent segment included in the segment pair is associated with a transparent object, based on information associated with the transparent object of the test image, and may determine the group belonged by the segment pair based on the determination result.

The foregoing and/or other aspects are achieved by providing an image processing apparatus, including a feature learning unit to perform a learning process of extracting a feature associated with a transparent object using a test image, and a transparent object detecting unit to determine a likelihood that segments of an input image are associated with the transparent object using a learned feature, and to detect the transparent object from the input image based on the determined likelihood.

The foregoing and/or other aspects are achieved by providing an image processing method, including segmenting an input image into a plurality of segments, determining a likelihood that a transparent object is present between adjacent segments among the plurality of segments, and detecting the transparent object from the input image based on the likelihood.

The foregoing and/or other aspects are achieved by providing an image processing method, including segmenting a test image into a plurality of segments, determining a group associated with a transparency attribute belonged by a segment pair including adjacent segment among the plurality of segments, and performing a learning process of extracting a feature associated with the segment pair based on the group belonged by the segment pair.

The foregoing and/or other aspects are achieved by providing an image processing method, including performing a learning process of extracting a feature associated with a transparent object using a test image, and determining a likelihood that segments of an input image are associated with the transparent object using a learned feature, and detecting the transparent object from the input image based on the determined likelihood.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
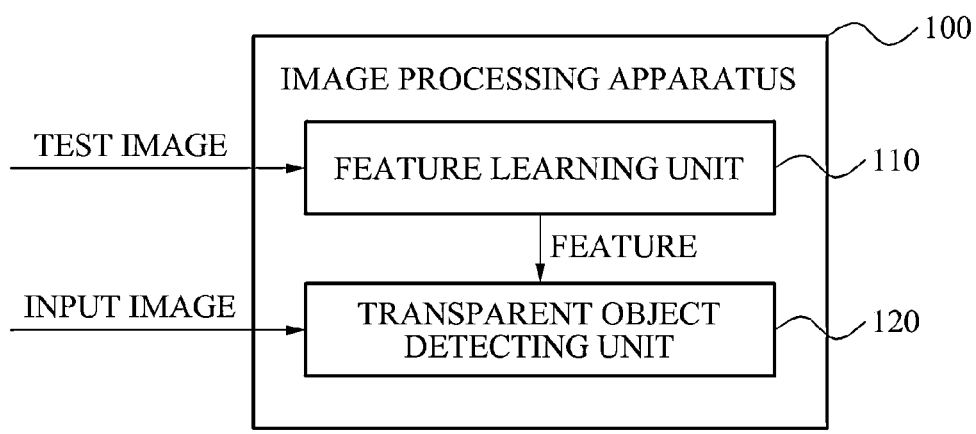
FIG. 1 illustrates a configuration of an image processing apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an image processing apparatus 100 according to an embodiment.

Referring to FIG. 1, the image processing apparatus 100 may include a feature learning unit 110 and a transparent object detecting unit 120.

The feature learning unit 110 may perform a learning process of extracting a feature associated with a transparent object using a test image. The test image may include information associated with the transparent object and an amplitude image and a depth image that are acquired using a time-of-flight (TOF) camera. Information associated with the transparent object may include a size and a position of the transparent object. For example, information associated with the transparent object may be a ground-truth translucency image Specifically, the feature learning unit 110 may segment the test image into a plurality of segments, and may determine a group associated with a transparency attribute that is belonged by a segment pair including adjacent segments among the plurality of segments. The feature learning unit 110 may determine whether at least one of the adjacent segments included in the segment pair is associated with the transparent object, based on information associated with the transparent object of the test image, and may determine the group belonged by the segment pair based on the determination result.

For example, when at least one of adjacent segments included in a segment pair corresponds to a transparent object, the feature learning unit 110 may determine the corresponding segment pair as a positive sample group. When none of the adjacent segments included in the segment pair correspond to the transparent object, the feature learning unit 110 may determine the corresponding segment pair as a negative sample group.

The feature learning unit 110 may extract a feature associated with the segment pair based on the group belonged by the segment pair.

A process of learning, by the feature learning unit 110, a feature will be further described with reference to FIG. 5.

The transparent object detecting unit 120 may determine a likelihood that segments of an input image may be associated with the transparent object using the feature learned by the feature learning unit 110, and to detect the transparent object from the input image based on the determined likelihood.

Specifically, the transparent object detecting unit 120 may segment the input image into a plurality of segments, may compare the learned feature with a difference in a depth image and an amplitude image between adjacent segments among the plurality of segments, and may determine a likelihood that the segments may be associated with the transparent object.

The transparent object detecting unit 120 may detect the transparent object using one of a global optimization scheme based on the likelihood and a local optimization scheme based on the likelihood.

A process of detecting, by the transparent object detecting unit 120, the transparent object will be further described with reference to FIG. 9.

Figure 2:
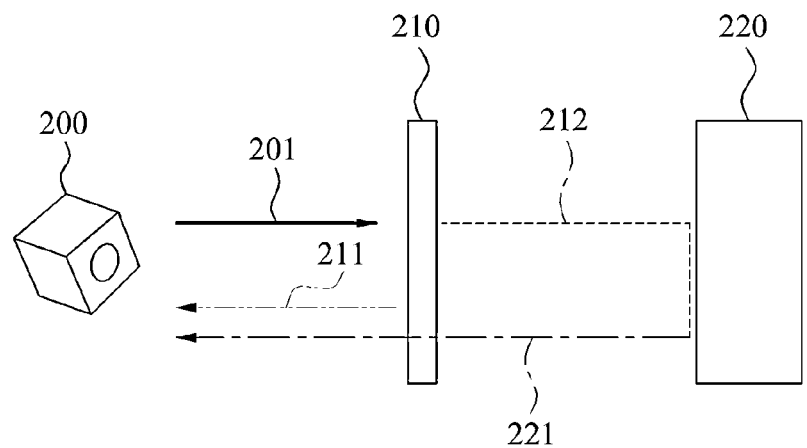
FIG. 2 illustrates an example of photographing a transparent object using a time-of-flight (TOF) camera according to an embodiment.

FIG. 2 illustrates an example of photographing a transparent object 210 using a TOF camera 200 according to an embodiment.

Referring to FIG. 2, the TOF 200 may emit output light 201 toward an object, may receive reflected light that is reflected from the object by the output light 201, and may measure depth information of the object based on amplitude of the reflected light. An image created using the reflected light that is received by the TOF camera 200 may be an amplitude image, and the TOF camera 200 may create a depth image using depth information.

When the object photographed using the TOF camera 200 is the transparent object 210, a portion of the output light 201 may be first reflected light 211 that is reflected from the transparent object 210, and remaining light 212 of the output light 201 may pass through the transparent object 210 and be transferred to a background 220. The background 220 may be an opaque object.

The remaining light 212 of the output light 201 may be second reflected light 221 that is reflected from the background 220. For example, when the output light 201, g(t), is defined by Equation 1, the first reflected light 211, $r_1(t)$, may be defined by Equation 2 and the second reflected light 221, $r_2(t)$, may be defined by Equation 3.

$$g(t) = A\cos(w \cdot t) + B \quad \text{[Equation 1]}$$

$$r_1(t) = A_F \cos(w \cdot t + \phi_F) \quad \text{[Equation 2]}$$

$$r_2(t) = B_F + A_B \cos(w \cdot t + \phi_B) + B_B \quad \text{[Equation 3]}$$

Here, A denotes amplitude of the output light 201, $A_F$ denotes amplitude of the first reflected light 211, $A_B$ denotes amplitude of the second reflected light 221, w denotes a modulation frequency of the output light 201, B denotes offset of the output light 201, $B_F$ denotes offset of the first reflected light 211, $B_B$ denotes offset of the second reflected light 221, $\phi_F$ denotes a phase difference occurring due to the transparent object 210, and $\phi_B$ denotes a phase difference occurring due to the background 220. A phase difference may be converted to depth and thus, may be used as depth information.

When the object photographed using the TOF camera 200 is the transparent object 210, the TOF camera 200 may measure depth information by receiving the reflected light including the first reflected light 211 and the second reflected light 221. The reflected light r(t) received by the TOF camera 200 may be defined by Equation 4.

$$r(t) = A_F \cos(w \cdot t + \phi_F) + B_F + A_B \cos(w \cdot t + \phi_B) + B_B \quad \text{[Equation 4]}$$

To measure depth information of the transparent object 210, correlation between the output light 201 and the reflected light received by the TOF camera 200 may be calculated according to Equation 5.

$$C(\tau) = \frac{AA_F}{2}\cos(w\cdot\tau+\varphi_F)+BB_F+\frac{AA_E}{2}\cos(w\cdot\tau+\varphi_B)+BB_B \quad \text{[Equation 5]}$$

The TOF camera 200 may measure depth information according to Equation 6.

$$\varphi° = \arctan\left(\frac{C\left(\frac{3\pi}{2w}\right)-C\left(\frac{\pi}{2w}\right)}{C(0)-C\left(\frac{\pi}{w}\right)}\right) = \arctan\left(\frac{A_F\sin\varphi_F+A_E\sin\varphi_E}{A_F\cos\varphi_F+A_E\cos\varphi_E}\right) \quad \text{[Equation 6]}$$

When the object photographed using the TOF camera 200 is an opaque object, $A_B=0$ in Equation 6 and thus, the component $A_F$ may be erased from numerator/denominator and $\varphi_F$ corresponding to depth of the object may be obtained. On the contrary, when the object photographed using the TOF camera 200 is the transparent object 210, $A_B$ and $A_F$ may have a value excluding "0". Accordingly, a value of measured depth information may vary based on amplitude of the first reflected light 211 and amplitude of the second reflected light 221.

For example, even though the transparent object 210 is positioned at identical depth, a value of depth information of the transparent object 210 may vary based on the amplitude of the second reflected light 221.

When the amplitude of the first reflected light 211 is greater than the amplitude of the second reflected light 221, depth information measured by the TOF camera 200 may have a value proximate to depth information of the transparent object 210 as expressed by Equation 7.

$$\varphi' \cong \arctan\left(\frac{\sin\varphi_F}{\cos\varphi_F}\right) = \varphi_F \quad \text{[Equation 7]}$$

On the contrary, when the amplitude of the second reflected light 221 is greater than the amplitude of the first reflected light 211, depth information measured by the TOF camera 200 may have a value proximate to depth information of the background 220.

Figure 3:
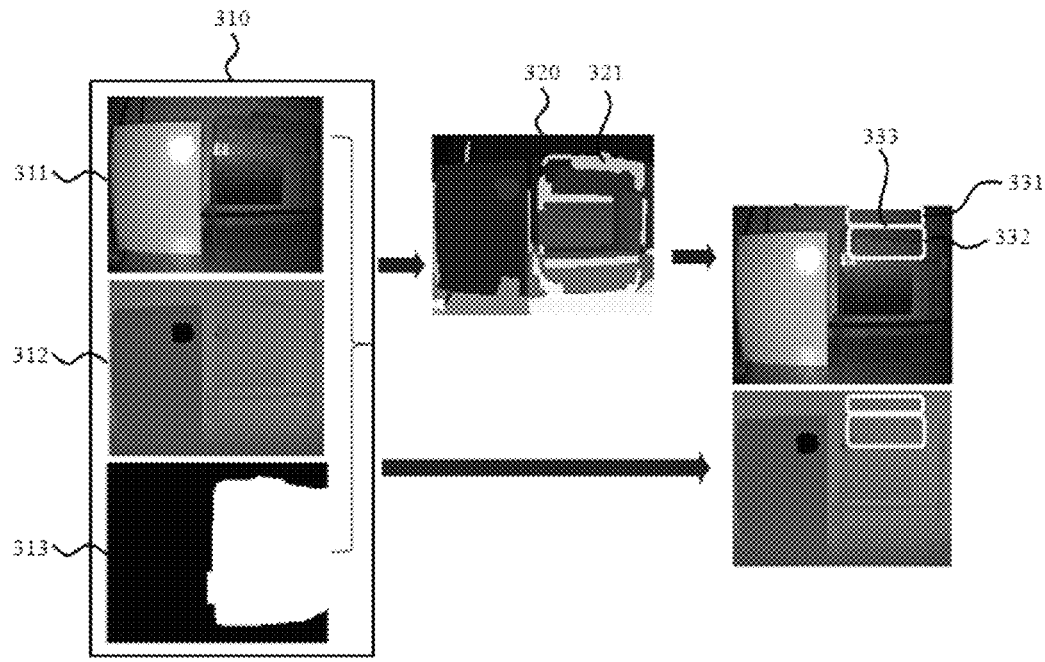
FIG. 3 illustrates an operation process of a feature learning unit according to an embodiment.

FIG. 3 illustrates an operation process of the feature learning unit 110 according to an embodiment.

Referring to FIG. 3, the feature learning unit 110 may receive a test image 310 that includes an amplitude image 311, a depth image 312, and a ground-truth translucency image 313. The ground-truth translucency image 313 may be information indicating a size and a position of a transparent object desired to be tested.

The feature learning unit 110 may segment the test image 310 into a plurality of segments 321 using the amplitude image 311 and the depth image 312. A segmented image 320 may be an image in which a single object is segmented into the plurality of segments 321 based on reflected light.

The feature learning unit 110 may verify whether each of the segments 321 included in the segmented image 320 is a transparent segment corresponding to the transparent object, using the ground-truth translucency image 313.

The feature learning unit 110 may determine, as a positive sample group, a segment pair in which at least one of adjacent segments corresponds to the transparent object, and may determine, as a negative sample group, a segment pair in which none of adjacent segments correspond to the transparent object.

The feature learning unit 110 may learn a feature between a first segment 331 and a second segment 332 that are adjacent to each other, using a learning machine. The feature between the first segment 331 and the second segment 332 may be information used to verify whether a boundary 333 between the first segment 331 and the second segment 332 is a boundary between transparent segments, a boundary between a transparent segment and an opaque segment, or a boundary between opaque segments.

By learning a feature between segments included in a segment pair for each group, the feature learning unit 110 may classify and learn a feature between transparent segments and a feature between opaque segments.

Figure 4:
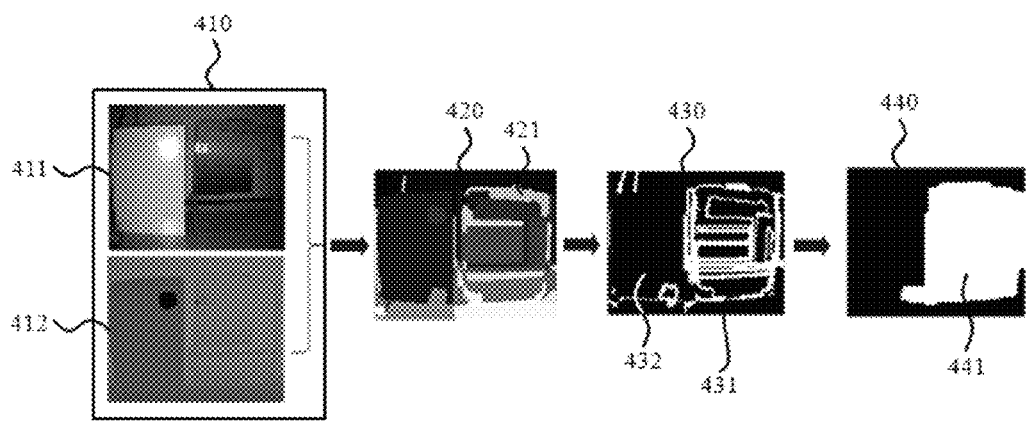
FIG. 4 illustrates an operation process of a transparent object detecting unit according to an embodiment.

FIG. 4 illustrates an operation process of the transparent object detecting unit 120 according to an embodiment.

Referring to FIG. 4, the transparent object detecting unit 120 may receive an input image 410 that includes an amplitude image 411 and a depth image 412. The input image 410 may be identical to or differ from the test image 310 of FIG. 3. For example, the transparent object detecting unit 120 may test transparent object detection performance by employing the same input image as the test image 310. The transparent object detecting unit 120 may also extract a transparent object from an input image that differs from the test image 310 and thus, in which information associated with the transparent object is absent.

The transparent object detecting unit 120 may segment the input image 410 into a plurality of segments 421 using the amplitude image 411 and the depth image 412. A segmented image 420 may be an image in which a single object is segmented into the plurality of segments 421 based on reflected light.

The transparent object detecting unit 120 may determine a likelihood that corresponding segments may be associated with the transparent object by comparing a learned feature with a difference in the amplitude image 411 and the depth image 412 between adjacent segments among the segmented segments 421. Here, the transparent object detecting unit 120 may create an image 430 in which segment color is differently displayed based on the likelihood. For example, a segment 431 having a relatively high likelihood to be associated with the transparent object may be displayed using a bright color and a segment 432 having a relatively low likelihood to be associated with the transparent object using a dark color.

The transparent object detecting unit 120 may create an image 440 from which a transparent object 441 is detected, using a global optimization scheme based on the determined likelihood or a local optimization scheme based on the determined likelihood.

Figure 5:
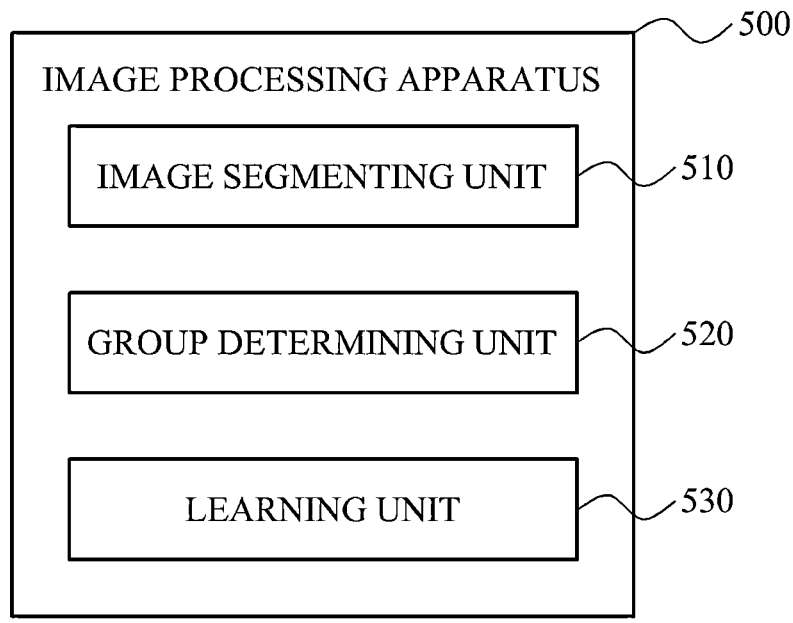
FIG. 5 illustrates a configuration of an image processing apparatus according to another embodiment.

FIG. 5 illustrates a configuration of an image processing apparatus 500 according to another embodiment.

The image processing apparatus 500 of FIG. 5 may be configured to be identical to the feature learning unit 110 of FIG. 1.

Referring to FIG. 5, the image processing apparatus 500 may include an image segmenting unit 510, a group determining unit 520, and a learning unit 530.

The image segmenting unit 510 may segment a test image into a plurality of segments. The image segmenting unit 510 may segment the input image using at least one of a depth image and an amplitude image included in the test image.

The group determining unit 520 may determine a group associated with a transparency attribute that is belonged by a segment pair including adjacent segments among the plurality of segments.

Here, the group determining unit 520 may determine whether at least one of the adjacent segments included in the segment pair is associated with a transparent object, based on information associated with the transparent object of the test image, and may determine the group belonged by the segment pair based on the determination result.

For example, when at least one of the adjacent segments included in the segment pair corresponds to the transparent object, the group determining unit 520 may determine the corresponding segment pair as a positive sample group. When none of the adjacent segments included in the segment pair do correspond to the transparent object, the group determining unit 520 may determine the corresponding segment pair as a negative sample group.

The learning unit 530 may perform a learning process of extracting a feature associated with the segment pair based on the group belonged by the segment pair.

Specifically, the learning unit 530 may extract a common feature as a feature of a positive sample group by measuring a change in a depth image and an amplitude image between segments of a segment pair included in the positive sample group. Also, the learning unit 530 may extract a common feature as a feature of a negative sample group by measuring a change in a depth image and an amplitude image between segments of a segment pair included in the negative sample group.

For example, when a first segment and a second segment belong to the positive sample group, a difference between amplitude information of the first segment and amplitude information of the second segment and a difference between depth information of the first segment and depth information of the second segment may be greater than "0". When the first segment and the second segment belong to the negative sample group, a difference between amplitude information of the first segment and amplitude information of the second segment and a difference between depth information of the first segment and depth information of the second segment may become close to "0". Here, when the first segment and the second segment belong to the positive sample group, the learning unit 530 may extract, as a feature, the difference between amplitude information of the first segment and amplitude information of the second segment and the difference between depth information of the first segment and depth information of the second segment.

When the first segment and the second segment belong to the positive sample group, amplitude information of the first segment and the second segment and distance information of the first segment and the second segment may not establish a proportional relationship. Accordingly, the learning unit 530 may extract, as a feature, information regarding whether a proportional relationship is established between amplitude information of the first segment and the second segment and distance information of the first segment and the second segment.

The learning unit 530 may determine the respective histogram distributions by calculating a feature value of the positive sample group and a feature value of the negative sample group using the extracted feature. When the histogram distribution of the negative sample group and the histogram distribution of the positive sample group differ, the learning unit 530 may learn the corresponding feature as a feature for identifying a positive sample group and a negative sample group.

The learning unit 530 may learn a classifier using extracted or determined features. For example, the classifier may be one of a support vector machine and a neural network, and may use a classification function such as a class label, a class probability, and a class rank, for example. The classification function may indicate a positive value in a case in which a segment pair is close to the positive sample group, and may indicate a negative value in a case in which the segment pair is close to the negative sample group. The classification function of the classifier generated as the learning result using N features may be expressed as $L(F_1, F_2, \ldots F_N)$.

The learning unit 530 may learn the classifier by configuring a plurality of features as a single feature vector, and may independently learn each of the plurality of features.

Figure 6:
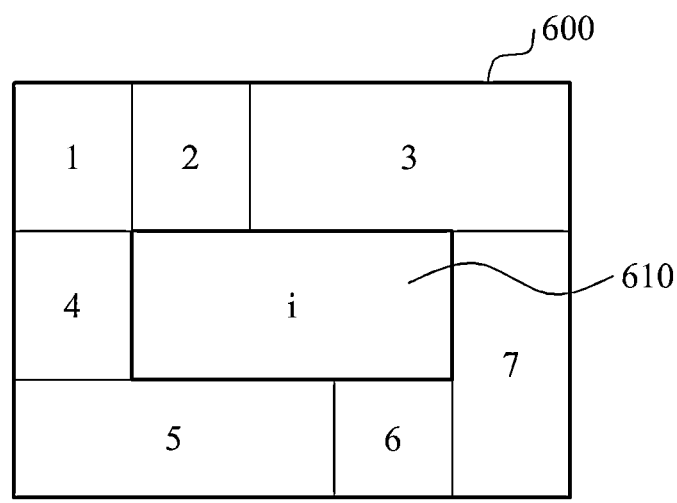
FIG. 6 illustrates an example of segmenting a single object into a plurality of segments according to an embodiment.

FIG. 6 illustrates an example of segmenting a single object into a plurality of segments according to an embodiment.

Referring to FIG. 6, all of segments 1, 2, 3, 4, 5, 6, and 7 adjacent to an $i^{th}$ segment 610 positioned within a transparent object 600 may be transparent segments. Accordingly, a feature associated with the $i^{th}$ segment 610 may be a feature between transparent segments.

In this example, when an amplitude value of a segment adjacent to the $i^{th}$ segment 610 is greater than an amplitude value of the $i^{th}$ segment 610, a depth value of the segment adjacent to the $i^{th}$ segment 610 may also be greater than a depth value of the $i^{th}$ segment 610.

Accordingly, a feature $F_1$ associated with the $i^{th}$ segment 610 may be greater than "0".

$$F_1 = \sum_{j \in \Omega_i} (A_i - A_j)(D_i - D_j) \quad \text{[Equation 8]}$$

In Equation 8, $A_i$ denotes the amplitude value of the $i^{th}$ segment 610, $D_i$ denotes the depth value of the $i^{th}$ segment 610, $\Omega_i$ denotes a set of segments adjacent to the $i^{th}$ segment 610, and j denotes a number indicated in the segment adjacent to the $i^{th}$ segment 610.

An amplitude value and a depth value of each segment may be an average value or a median value of pixels included in a corresponding segment.

When the $i^{th}$ segment 610 is not positioned within the transparent object 600, a predetermined correlation between the amplitude value and the depth value of the $i^{th}$ segment 610 and the amplitude value and the depth value of the adjacent segment may be absent and thus, $F_1$ may have a value close to "0".

When $F_1$ is close to "0" rather than to a reference value, the learning unit 530 may indicate that the $i^{th}$ segment 610 is not positioned within the transparent object 600 and may learn the above feature as a feature for distinguishing a transparent object and an opaque object.

When output light passes through the transparent object 600, a portion of the output light may be absorbed by the transparent object 600 or a background. Accordingly, attenuation of amplitude may occur in a boundary between the transparent object 600 and the background.

For example, when a depth value of a $k^{th}$ segment adjacent to the $i^{th}$ segment 610 is greater than a depth value of the $i^{th}$ segment 610, an amplitude value $A_k$ of the $k^{th}$ segment may be greater than an amplitude value $A_i$ of the $i^{th}$ segment 610.

Accordingly, the learning unit 30 may learn a feature $F_2$ according to Equation 9 as a feature for describing a boundary between transparency and opaqueness.

$$F_2 = A_k - A_i, \text{ if } k \in \Omega_p, D_i < D_k \quad \text{[Equation 9]}$$

Figure 7:
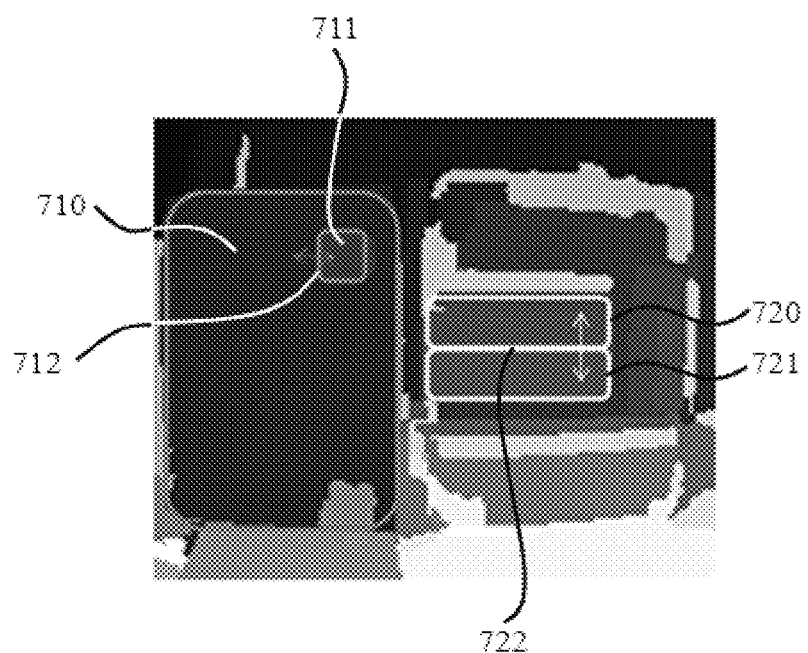
FIG. 7 illustrates an example of a process of learning a feature according to an embodiment.

FIG. 7 illustrates an example of a process of learning a feature according to an embodiment.

When a first segment 710 and a second segment 711 do not correspond to a transparent object, the group determining unit 520 may determine a pair of the first segment 710 and the second segment 711 as a negative sample group.

When a third segment 720 and a fourth segment 721 correspond to the transparent object, the group determining unit 520 may determine a pair of the third segment 720 and the fourth segment 721 as a positive sample group.

The learning unit 530 may learn a feature for identifying a boundary 712 between opaque segments by extracting a common feature that is obtained by measuring a change in a depth image and an amplitude image between the first segment 710 and the second segment 711.

The learning unit 530 may learn a feature for identifying a boundary 722 between transparent segments by extracting a common feature that is obtained by measuring a change in a depth image and an amplitude image between the third segment 720 and the fourth segment 721.

Figure 8:
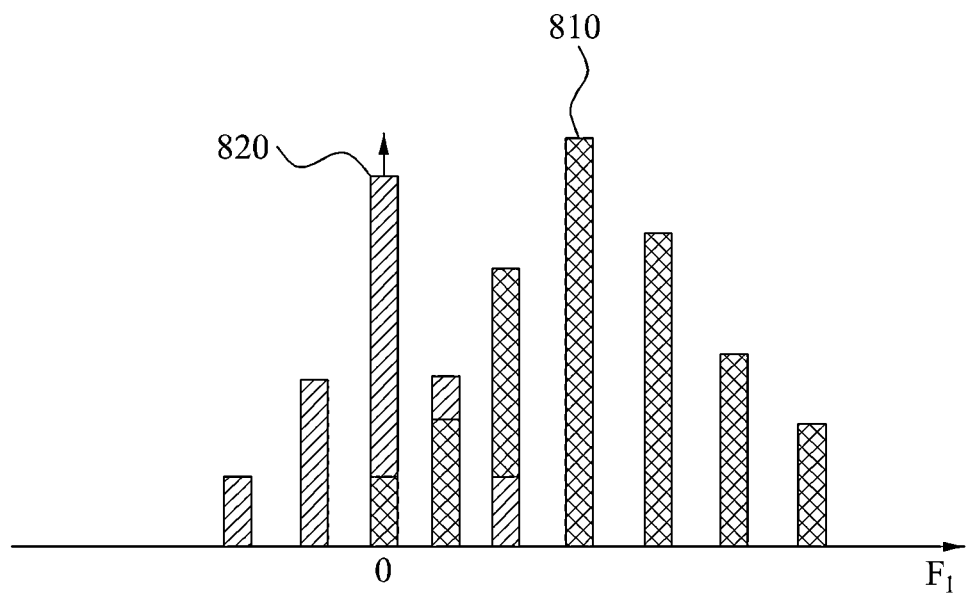
FIG. 8 illustrates an example of a histogram of a learned feature according to an embodiment.

FIG. 8 illustrates an example of a histogram of a learned feature according to an embodiment.

In the case of calculating a feature $F_1$ with respect to a segment pair, the learning unit 530 may determine a histogram distribution of a positive sample group and a histogram distribution of a negative sample group as shown in FIG. 8.

As illustrated in FIG. 8, values 810 of the histogram distribution of the positive sample group may be distributed to be greater than "0" by a predetermined threshold, and values 820 of the histogram distribution may be distributed to be close to "0". Accordingly, the values 810 and the values 820 may differ.

Accordingly, the learning unit 530 may learn the feature $F_1$ as a feature for identifying a positive sample and a negative sample.

Figure 9:
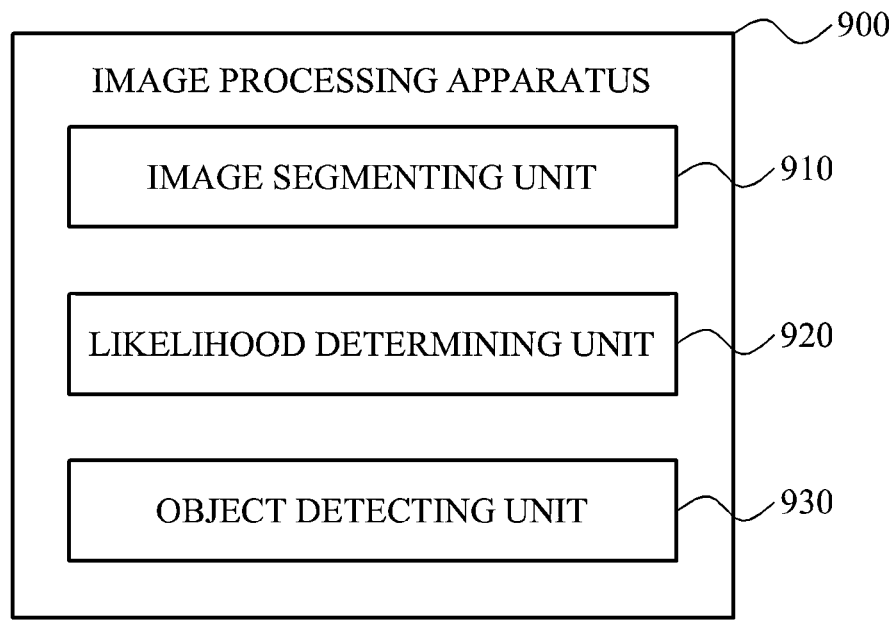
FIG. 9 illustrates a configuration of an image processing apparatus according to still another embodiment.

FIG. 9 illustrates a configuration of an image processing apparatus 900 according to still another embodiment.

The image processing apparatus 900 of FIG. 9 may be configured to be identical to the transparent object detecting unit 120 of FIG. 1.

Referring to FIG. 9, the image processing apparatus 900 may include an image segmenting unit 910, a likelihood determining unit 920, and an object detecting unit 930.

The image segmenting unit 910 may segment an input image into a plurality of segments. The image segmenting unit 910 may segment the input image using at least one of a depth image and an amplitude image included in the input image.

The likelihood determining unit 920 may determine a likelihood that a transparent object may be present between adjacent segments among the plurality of segments.

The likelihood determining unit 920 may determine a likelihood that a segment pair including the adjacent segments may belong to a group associated with a transparency attribute. The group associated with the transparency attribute may include a segment pair in which at least one segment is transparent.

The likelihood determining unit 920 may determine a likelihood that the segment pair including the adjacent segments may belong to the group associated with the transparency attribute, using a learning model associated with feature extraction. For example, the likelihood determining unit 920 may determine a likelihood that the segment pair may be included in a positive sample group using a classification function, for example, $L(F_1, F_2, \ldots F_N)$ included in the classifier of the image processing apparatus 500 or the feature learning unit 110.

According to an increase in the likelihood that the segment pair may be included in the positive sample group, a likelihood that the segment pair may be included in a negative sample group may decrease. Accordingly, the likelihood determining unit 920 may also determine the likelihood that the segment pair may be included in the negative sample group, based on the likelihood that the segment pair may be included in the positive sample group. For example, when the likelihood that the segment pair may be included in the positive sample group is 30%, the likelihood determining unit 920 may determine that the likelihood that the segment pair may be included in the negative sample group is 70%.

The likelihood determining unit 920 may differently display a segment color based on the likelihood that the segment pair may be included in the positive sample group and the likelihood that the segment pair may be included in the negative sample group. For example, the likelihood determining unit 920 may display a segment color to be bright according to an increase in the likelihood that the segment pair may be included in the positive sample group, and may display a segment color to be dark according to an increase in the likelihood that the segment pair may be included in the negative sample group.

The object detecting unit 930 may detect a transparent object from the input image based on the likelihood determined by the likelihood determining unit 920.

The object detecting unit 930 may detect the transparent object using one of a global optimization scheme based on the likelihood and a local optimization scheme based on the likelihood.

In the case of using the global optimization scheme based on the likelihood, the object detecting unit 930 may detect the transparent object by setting each of segments as a node of a graph, and by applying the likelihood as a weight between nodes.

The object detecting unit 930 may extract a contour of the transparent object by applying a curve evolution algorithm that is set to penetrate into only a boundary between segments having the likelihood less than 50%.

In the case of using the local optimization scheme based on the likelihood, the object detecting unit 930 may detect the transparent object by selecting one of segments based on the likelihood, by setting the selected segment as an initial seed of a transparent area, and by merging a segment at the initial seed in a descending order of the likelihood.

Figure 10:
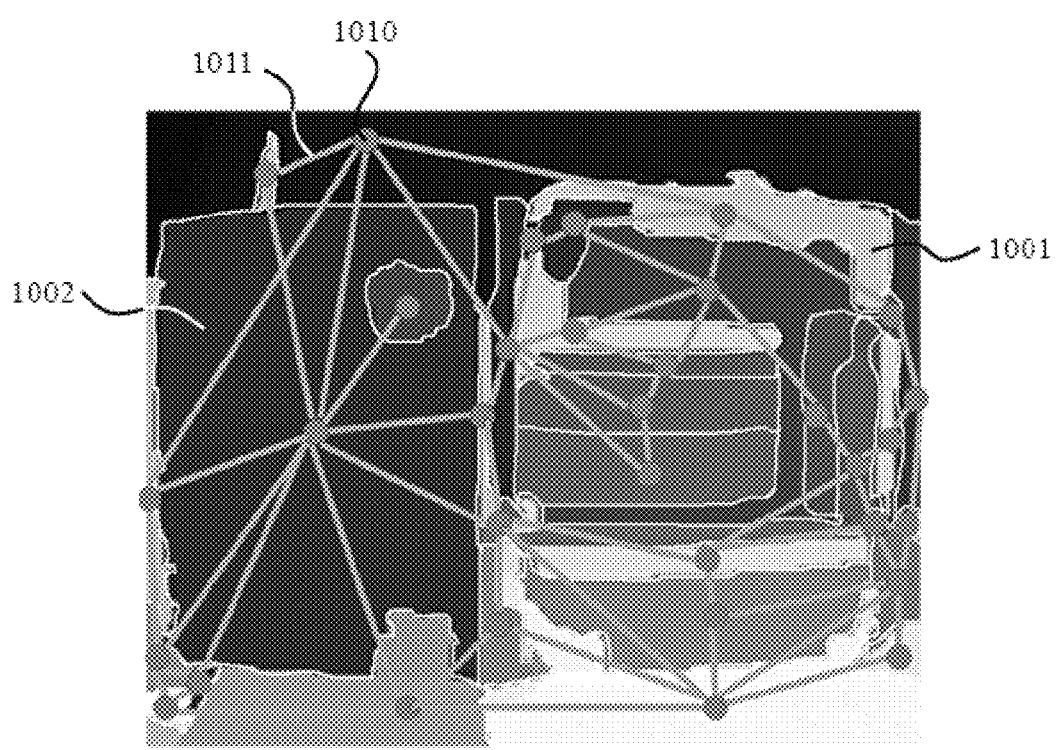
FIG. 10 illustrates an example of segments expressed as a graph according to an embodiment.

FIG. 10 illustrates an example of segments expressed as a graph according to an embodiment.

The likelihood determining unit 920 may display, to be bright, a color of a segment 1001 having a relatively high likelihood to be included in a positive sample group, and may display, to be dark, a color of a segment 1002 to be included in a negative sample group.

In the case of using a global optimization scheme based on the likelihood, the object detecting unit 930 may set each segment 1010 as a node of a graph, and may apply a likelihood 1011 of a segment pair as a weight between nodes. The object detecting unit 930 may extract a transparent object using a graph-based optimization scheme. For example, the graph based optimization scheme may be a graph-cut algorithm.

In the case of using a local optimization scheme based on the likelihood, the object detecting unit 930 may calculate a sum of the likelihood 1011 between each segment 1010 and another segment, and may set a segment having the largest sum as an initial seed of a transparent seed. The object detecting unit 930 may detect the transparent object from the input image by sequentially merging, in a descending order of the likelihood, segments positioned around the segment set as the initial seed, and by expanding a transparent area, for example, region growing.

Figure 11:
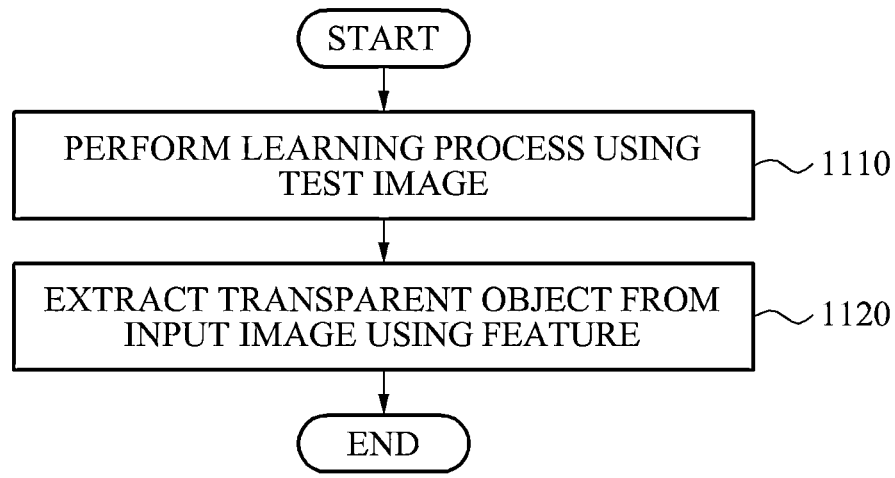
FIG. 11 illustrates a flowchart of an image processing method according to an embodiment.

FIG. 11 illustrates a flowchart of an image processing method according to an embodiment.

The image processing method may be performed by the image processing apparatus 100 of FIG. 1.

In operation 1110, the feature learning unit 110 may perform a learning process of extracting a feature associated with a transparent object using a test image.

Specifically, the feature learning unit 110 may segment the test image into a plurality of segments, and may determine a group associated with a transparency attribute that is belonged by a segment pair including adjacent segments among the plurality of segments. The feature learning unit 110 may determine whether at least one of the adjacent segments included in the segment pair is associated with the transparent object, based on information associated with the transparent object of the test image, and may determine the group belonged by the segment pair based on the determination result. The feature learning unit 110 may extract a feature associated with the segment pair based on the group belonged by the segment pair.

A process of learning, by the feature learning unit 110, a feature will be further described with reference to FIG. 12.

In operation 1120, the transparent object detecting unit 120 may determine a likelihood that segments of an input image may be associated with the transparent object based on the feature learned in operation 1110, and may detect the transparent object from the input image based on the determined likelihood.

Specifically, the transparent object detecting unit 120 may determine the likelihood that corresponding segments may be associated with the transparent object by segmenting the input image into the plurality of segments, and by comparing the learned feature with a difference in a depth image and an amplitude image between adjacent segments among the plurality of segments. The transparent object detecting unit 120 may detect the transparent object using one of a global optimization scheme based on the determined likelihood and a local optimization scheme based on the determined likelihood.

A process of detecting, by the transparent object detecting unit 120, the transparent object will be further described with reference to FIG. 13.

Figure 12:
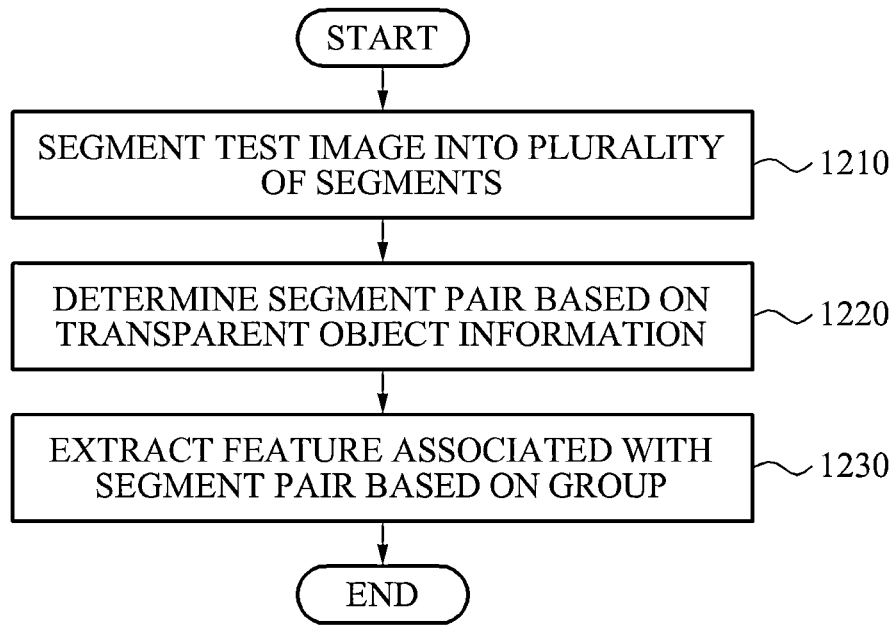
FIG. 12 illustrates a flowchart of an image processing method according to another embodiment.

FIG. 12 illustrates a flowchart of an image processing method according to another embodiment.

The image processing method may be performed by the feature learning unit 110 of the image processing apparatus 100 of FIG. 1 or the image processing apparatus 500 of FIG. 5. Operations 1210 through 1230 of FIG. 12 may be included in operation 1110 of FIG. 11.

In operation 1210, the image segmenting unit 510 may segment a test image into a plurality of segments. The image segmenting unit 510 may segment the input image using at least one of a depth image and an amplitude image included in the test image.

In operation 1220, the group determining unit 520 may determine a group associated with a transparency attribute that is belonged by a segment pair including adjacent segments among the plurality of segments. The group determining unit 520 may determine whether at least one of the adjacent segments included in the segment pair is associated with a transparent object of the test image based on information associated with the transparent object of the test image, and may determine a group belonged by the segment pair based on the determination result.

In operation 1230, the learning unit 530 may perform a learning process of extracting a feature associated with the segment pair based on the group belonged by the segment pair. Specifically, the learning unit 530 may extract, as a feature of a positive sample group, a common feature that is obtained by measuring a change in a depth image and an amplitude image between segments of a segment pair included in the positive sample group. The learning unit 530 may extract, as a feature of a negative sample group, a common feature that is obtained by measuring a change in a depth image and an amplitude image between segments of a segment pair included in the negative sample group.

The learning unit 530 may determine the respective histogram distributions by calculating a feature value of the positive sample group and a feature value of the negative sample group using the extracted feature. When the histogram distribution of the negative sample group and the histogram distribution of the positive sample group differ, the learning unit 530 may learn the corresponding feature as a feature for identifying a positive sample and a negative sample.

The learning unit 530 may learn a classifier using extracted or determined features. The learning unit 530 may learn the classifier by configuring a plurality of features as a single feature vector, and may independently learn each of the plurality of features.

Figure 13:
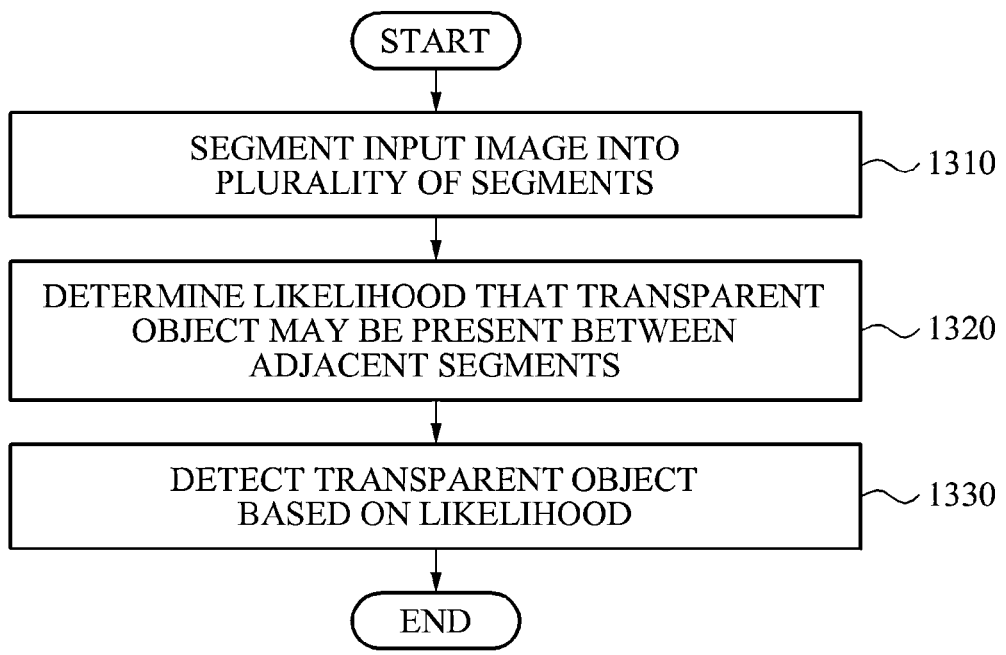
FIG. 13 illustrates a flowchart of an image processing method according to still another embodiment.

FIG. 13 illustrates a flowchart of an image processing method according to still another embodiment.

The image processing method may be performed by the transparent object detecting unit 110 of the image processing apparatus 100 of FIG. 1 or the image processing apparatus 900 of FIG. 9. Operations 1310 through 1330 of FIG. 13 may be included in operation 1120 of FIG. 11.

In operation 1310, the image segmenting unit 910 may segment an input image into a plurality of segments. The image segmenting unit 910 may segment the input image using at least one of a depth image and an amplitude image included in the input image.

In operation 1320, the likelihood determining unit 920 may determine a likelihood that a transparent object may be present between adjacent segments among the plurality of segments. Here, the likelihood determining unit 920 may determine a likelihood that a segment pair may be included in a positive sample group using a classification function, for example, $L(F_1, F_2, \ldots F_N)$ included in the classifier in operation 1110 of FIG. 11 or operation 1230 of FIG. 12.

In operation 1330, the object detecting unit 930 may detect a transparent object from the input image based on the likelihood determined in operation 1320. The object detecting unit 930 may detect the transparent object using one of a global optimization scheme based on the likelihood and a local optimization scheme based on the likelihood.

In the case of using the global optimization scheme based on the likelihood, the object detecting unit 930 may detect the transparent object by setting each of segments as a node of a graph, and by applying the likelihood as a weight between nodes.

In the case of using the local optimization scheme based on the likelihood, the object detecting unit 930 may detect the transparent object by selecting one of segments based on the likelihood, by setting the selected segment as an initial seed of a transparent area, and by merging a segment at the initial seed in a descending order of the likelihood.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
   an image segmenting unit to segment an input image into a plurality of segments;
   a likelihood determining unit to determine a likelihood that a transparent object is present between adjacent segments among the plurality of segments; and
   an object detecting unit to detect the transparent object from the input image based on the likelihood.

2. The image processing apparatus of claim 1, wherein the image segmenting unit is configured to segment the input image based on at least one of a depth image and an amplitude image included in the input image.

3. The image processing apparatus of claim 1, wherein:
   the likelihood determining unit is configured to determine a likelihood that a segment pair including adjacent segments belongs to a group associated with a transparency attribute, and
   the group associated with the transparency attribute comprises a segment pair in which at least one segment is transparent.

4. The image processing apparatus of claim 1, wherein the likelihood determining unit is configured to determine a likelihood that a segment pair including adjacent segments belongs to a group associated with a transparency attribute, using a learning model associated with feature extraction.

5. The image processing apparatus of claim 4, wherein the learning model is configured to extract a feature based on amplitude and depth of the respective segments constituting the segment pair using a test image.

6. The image processing apparatus of claim 1, wherein the object detecting unit is configured to detect the transparent object using one of a global optimization scheme based on the likelihood and a local optimization scheme based on the likelihood.

7. An image processing apparatus, comprising:
   an image segmenting unit to segment a test image into a plurality of segments;
   a group determining unit to determine a group associated with a transparency attribute that is belonged by a segment pair including adjacent segment among the plurality of segments; and
   a learning unit to perform a learning process of extracting a feature associated with the segment pair based on the group belonged by the segment pair.

8. The image processing apparatus of claim 7, wherein the group determining unit is configured to determine whether at least one of the adjacent segment included in the segment pair is associated with a transparent object, based on information associated with the transparent object of the test image, and determine the group belonged by the segment pair based on the determination result.

9. An image processing apparatus, comprising:
   a feature learning unit to perform a learning process of extracting a feature associated with a transparent object using a test image; and
   a transparent object detecting unit to determine a likelihood that segments of an input image are associated with the transparent object using a learned feature, and to detect the transparent object from the input image based on the determined likelihood.

10. The image processing apparatus of claim 9, wherein the feature learning unit comprises:
    an image segmenting unit to segment the test image into a plurality of segments;
    a group determining unit to determine a group associated with a transparency attribute that is belonged by a segment pair including adjacent segments among the plurality of segments; and
    a learning unit to perform a learning process of extracting a feature associated with the segment pair based on the group belonged by the segment pair.

11. The image processing apparatus of claim 10, wherein the group determining unit is configured to determine whether at least one of the adjacent segments included in the segment pair is associated with the transparent object, based on information associated with the transparent object of the test image, and determine the group belonged by the segment pair.

12. The image processing apparatus of claim 9, wherein the transparent object detecting unit comprises:
    an image segmenting unit to segment the input image into a plurality of segments;
    a likelihood determining unit to determine a likelihood that the transparent object is present between adjacent segments among the plurality of segments; and
    an object detecting unit to detect the transparent object from the input image based on the likelihood.

13. The image processing apparatus of claim 12, wherein the image segmenting unit is configured to segment the input image based on at least one of a depth image and an amplitude image included in the input image.

14. The image processing apparatus of claim 12, wherein the object detecting unit is configured to detect the transparent object using one of a global optimization scheme based on the likelihood and a local optimization scheme based on the likelihood.

15. An image processing method, comprising:
    segmenting, by an image processing apparatus, an input image into a plurality of segments;
    determining, by the image processing apparatus, a likelihood that a transparent object is present between adjacent segments among the plurality of segments; and
    detecting, by the image processing apparatus, the transparent object from the input image based on the likelihood.

16. The method of claim 15, wherein the segmenting comprises segmenting the input image based on at least one of a depth image and an amplitude image included in the input image.

17. The method of claim 15, wherein:
the determining comprises determining a likelihood that a segment pair including adjacent segments belongs to a group associated with a transparency attribute, and
the group associated with the transparency attribute comprises a segment pair in which at least one segment is transparent.

18. The method of claim 15, wherein the determining comprises determining a likelihood that a segment pair including adjacent segments belongs to a group associated with a transparency attribute, using a learning model associated with feature extraction.

19. The method of claim 18, wherein the learning model extracts a feature based on amplitude and depth of the respective segments constituting the segment pair using a test image.

20. The method of claim 15, wherein the detecting comprises detecting the transparent object using one of a global optimization scheme based on the likelihood and a local optimization scheme based on the likelihood.

21. An image processing method, comprising:
segmenting, by an image processing apparatus, a test image into a plurality of segments;
determining, by the image processing apparatus, a group associated with a transparency attribute belonged by a segment pair including adjacent segment among the plurality of segments; and
performing, by the image processing apparatus, a learning process of extracting a feature associated with the segment pair based on the group belonged by the segment pair.

22. The method of claim 21, wherein the determining comprises determining whether at least one of the adjacent segments included in the segment pair is associated with a transparent object, based on information associated with the transparent object of the test image, and determines the group belonged by the segment pair based on the determination result.

23. An image processing method, comprising:
performing, by an image processing apparatus, a learning process of extracting a feature associated with a transparent object using a test image; and
determining, by the image processing apparatus, a likelihood that segments of an input image are associated with the transparent object using a learned feature, and
detecting, by the image processing apparatus, the transparent object from the input image based on the determined likelihood.

24. The method of claim 23, wherein the performing comprises:
segmenting the test image into a plurality of segments;
determining a group associated with a transparency attribute that is belonged by a segment pair including adjacent segments among the plurality of segments; and
performing a learning process of extracting a feature associated with the segment pair based on the group belonged by the segment pair.

25. The method of claim 24, wherein the determining of the group comprises determining whether at least one of the adjacent segments included in the segment pair is associated with the transparent object, based on information associated with the transparent object of the test image, and determining the group belonged by the segment pair.

26. The method of claim 23, wherein the determining and the detecting comprises:
segmenting the input image into a plurality of segments;
determining a likelihood that the transparent object is present between adjacent segments among the plurality of segments; and
detecting the transparent object from the input image based on the likelihood.

27. The method of claim 26, wherein the segmenting comprises segmenting the input image based on at least one of a depth image and an amplitude image included in the input image.

28. A non-transitory computer-readable medium comprising a program for instructing a computer to perform the method of claim 15.

* * * * *